US012790116B2

(12) United States Patent
Austrheim

(10) Patent No.: US 12,790,116 B2
(45) Date of Patent: Nov. 10, 2026

(54) CONVEYOR SYSTEM

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 1042 days.

(21) Appl. No.: 17/800,189

(22) PCT Filed: Feb. 2, 2021

(86) PCT No.: PCT/EP2021/052404
§ 371 (c)(1),
(2) Date: Aug. 16, 2022

(87) PCT Pub. No.: WO2021/165030
PCT Pub. Date: Aug. 26, 2021

(65) Prior Publication Data

US 2023/0065714 A1 Mar. 2, 2023

(30) Foreign Application Priority Data

Feb. 18, 2020 (NO) .................................... 20200209

(51) Int. Cl.
*B65G 1/04* (2006.01)
*B65G 1/06* (2006.01)
(Continued)

(52) U.S. Cl.
CPC ......... *B65G 1/0464* (2013.01); *B65G 1/0471* (2013.01); *B65G 1/0478* (2013.01);
(Continued)

(58) Field of Classification Search
CPC .. B65G 1/0464; B65G 1/0478; B65G 1/0485; B65G 1/06; B65G 37/00; B65G 39/00; B65G 39/04; B65G 1/0471
(Continued)

(56) References Cited

U.S. PATENT DOCUMENTS 3,902,589 A * 9/1975 Bylsma .................. B65G 13/04 198/790
2016/0129587 A1* 5/2016 Lindbo ................ B65G 1/0464 700/218
(Continued)

FOREIGN PATENT DOCUMENTS

DE 10049077 A1 * 4/2002 ......... B65G 47/2445
GB 2571827 A 9/2019
(Continued)

OTHER PUBLICATIONS

EP-3168799-A1 / DE-10049077-A1 (Year: 2002).*
(Continued)

*Primary Examiner* — Ernesto A Suarez
*Assistant Examiner* — Laurence R Brothers
(74) *Attorney, Agent, or Firm* — Baker Botts L.L.P.

(57) ABSTRACT

An automated storage and retrieval system includes a framework structure and a delivery system. The framework structure includes upright members, horizontal members, and a storage volume comprising storage columns and port columns arranged in rows between the upright members and the horizontal members. A rail system is arranged across the top of framework structure. The rail system includes a first set of parallel rails arranged to guide movement of container handling vehicles in a first direction across the top of the frame structure, and a second set of parallel rails arranged perpendicular to the first set of rails to guide movement of
(Continued)

the container handling vehicles in a second direction which is perpendicular to the first direction, and access openings to the columns, the container handling vehicles being operable to raise a storage container from the storage columns, and transport the storage container above the storage columns to the port column, and lower the storage container into the port column. The delivery system includes at least one conveyor system including a first conveyor and a second conveyor. The first conveyor is located below the rail system and extending from a first end below the port column to a second end below a second column, the first end arranged to receive the storage container through the port column, the first conveyor comprising a first drive device for moving the storage container on the first conveyor between the first and second ends. The second conveyor is aligned with the first conveyor and arranged as an extension of the first conveyor. The second conveyor has a first end positioned adjacent the first end of the first conveyor and a second end positioned outside an outer periphery of the framework structure. The second conveyor includes a second drive device for moving the storage container on the second conveyor between its first and seconds ends. The at least one conveyor system is arranged for returning the storage container through the port column by moving the storage container from the second end of the second conveyor to the first end of the first conveyor via the second end of the first conveyor.

13 Claims, 8 Drawing Sheets

(51) Int. Cl.
*B65G 37/00* (2006.01)
*B65G 39/00* (2006.01)
*B65G 39/04* (2006.01)

(52) U.S. Cl.
CPC ............. *B65G 1/0485* (2013.01); *B65G 1/06* (2013.01); *B65G 37/00* (2013.01); *B65G 39/00* (2013.01); *B65G 39/04* (2013.01)

(58) Field of Classification Search
USPC .......................................................... 198/817
See application file for complete search history.

(56) References Cited

U.S. PATENT DOCUMENTS

| | | | | |
|---|---|---|---|---|
| 2019/0300286 | A1* | 10/2019 | Hognaland | B65G 1/1378 |
| 2019/0344971 | A1* | 11/2019 | Smit | B65G 47/2445 |

FOREIGN PATENT DOCUMENTS

| | | | | |
|---|---|---|---|---|
| JP | 2003-034405 | A | 2/2003 | |
| NO | 317366 | B1 | 10/2004 | |
| WO | 2014/075937 | A1 | 5/2014 | |
| WO | 2014/090684 | A1 | 6/2014 | |
| WO | 2014/203126 | A1 | 12/2014 | |
| WO | 2015/193278 | A1 | 12/2015 | |
| WO | 2016/198467 | A1 | 12/2016 | |
| WO | 2017/211640 | A1 | 12/2017 | |
| WO | WO-2018069282 | A1 * | 4/2018 | B65G 1/1378 |
| WO | 2018/146304 | A1 | 8/2018 | |
| WO | 2019/001816 | A1 | 1/2019 | |
| WO | 2019/103637 | A1 | 5/2019 | |
| WO | 2019/141877 | A1 | 7/2019 | |
| WO | 2019/238641 | A1 | 12/2019 | |
| WO | 2019/238645 | A1 | 12/2019 | |
| WO | 2019/243549 | A1 | 12/2019 | |

OTHER PUBLICATIONS

EP-1205410-A1 / DE-10049077-A1 (Year: 2002).*
Benoit Martin, Extended European Search Report for European patent application No. EP24189029.2, dated Sep. 5, 2024, 10 pages, published by the European Patent Office, Munich, Germany.
International Search Report issued in PCT/EP2021/052404 on Apr. 12, 2021 (5 pages).
Written Opinion of the International Searching Authority issued in PCT/EP2021/052404 on Apr. 12, 2021 (10 pages).
Norwegian Search Report issued in NO 20200209 mailed on Sep. 18, 2020 (2 pages).

* cited by examiner

CONVEYOR SYSTEM

TECHNICAL FIELD

The present invention relates to an automated storage and retrieval system for storage and retrieval of containers, in particular to a conveyor system and a method for returning storage containers from an access station to a framework structure of the automated storage and retrieval system.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201*a*,301*a*, and first and second sets of wheels 201*b*,301*b*,201*c*,301*c* which enable the lateral movement of the container handling vehicles 201,301 in the X direction and in the Y direction, respectively. In FIGS. 2 and 3 two wheels in each set are fully visible. The first set of wheels 201*b*,301*b* is arranged to engage with two adjacent rails of the first set 110 of rails, and the second set of wheels 201*c*,301*c* is arranged to engage with two adjacent rails of the second set 111 of rails. At least one of the sets of wheels 201*b*,301*b*,201*c*,301*c* can be lifted and lowered, so that the first set of wheels 201*b*,301*b* and/or the second set of wheels 201*c*,301*c* can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301*a* in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201*a* as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. The picking or stocking station may be operated by a human operator, a robotic operator, or both a human and a robotic operator. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 150 which typically is computerized and which typically comprises a database for keeping track of the storage containers 106.

FIG. 4*a* is a schematic top view of a prior art conveyor port 400 disclosed in https://youtu.be/4iowCTtOpuI, 10 Jun. 2016. The prior art conveyor port 400 comprises a belt conveyor 401. While the illustrated belt conveyor 401 comprises two parallel belts, the two parallel belts could be replaced by a single belt. The belt conveyor 401 further comprises one or more drive devices for moving a storage container on the belt conveyor 401. The conveyor port 400 is defined by three equally sized parts 402, 403, 404, each part having space for a storage container. Thus, the size of the belt conveyor 401 is approximately the size of three storage containers. An access station, or handling part, 404 of the conveyor port 400 is, as indicated by an outer periphery 405 of the framework structure 100, positioned outside the framework structure 100. The handling part may be a picking and/or supply station allowing an operator to pick or supply items from/to the framework structure 100. A put/get part 403 of the conveyor port 400 is located below the rail system 108 and next to the handling part 404. The put/get part 403 below a port column 119. A wait part 402 of the conveyor port 400 is located next to the put/get part 403 further into framework structure 100, typically below a storage column FIG. 4*b* schematically illustrates the functionality of the conveyor port 400. i-ii) Once a storage container A has been presented to an operator at the handling part 404, the belt conveyor 401 moves storage container A to the wait part 402. While the storage container A was presented to the operator, another storage container B is lowered through the port column 119 to a position above the get/put part 403. Storage container B may be held in position by the lifting device of a container handling vehicle 201, 301. iii) While the storage container A is in the wait part 402, the storage container B is lowered and released on the belt conveyor 401 in the put/get part 403, e.g. by the lifting device of the container handling vehicle. iv-v) When the second storage container B has been released on the belt conveyor 401, the belt conveyor 401 moves both storage container A and storage container B simultaneously, such that storage container B is moved to the handling part 404, and storage container A is moved to the put/get part 403. vi) Storage container A is then lifted through the port column 119, e.g. by the lifting device of the container handling vehicle, for storage in a storage column 105. Storage container B is at the same time presented to the operator at the handling part 404.

Once storage container A has been removed from the port column 119, another storage container may be lowered through the port column 119 to the position above the get/put part 403. This happens while storage container B is presented to the operator at the handling part 404. Furthermore, for a quick removal of a storage container from the conveyor belt 401, the lifting device of the handling vehicle is kept in a ready position immediately above the put/get part 403 after releasing the storage container on the conveyor belt 401.

Typically, the time the container handling vehicles require to pick up the first storage container and put the next storage container immediately above the put/get part 403 is shorter than the time the operator uses to pick/put an object from/into the presented storage container. Thus, when the operator is ready to receive the next storage container, the next storage container is already in position immediately above the put/get part 403, ready to be put on the belt 401. In an alternative configuration one could have considered adding a wait/put position replacing the wait part 402 to allow putting a storage container on the belt while simultaneously lifting a storage container from the belt 401. However, the alternative configuration would require replacing a storage column with a port column, resulting in reduced storage capacity. The prior art conveyor port 400 provides a fast, low complexity port, using one column 119 for put/get operation to the storage columns 105.

WO2017211640 discloses a storage system comprising a conveyor system configured to convey a storage container from a put position to a picking and/or supply station and further to a get position, where the conveyor system comprises a tiltable conveyor configured to convey the storage container from the put position to the get position via picking and/or supply station. The tiltable conveyor is required to get the storage container to the put position and the get position at different vertical levels. Furthermore, the put position and the get position are provided below two different grid locations, requiring two grid cells for put/get operation.

WO2018069282 discloses a storage system comprising a conveyor system configured to convey a storage container from a put position to a picking and/or supply station and further to a get position, where the conveyor system comprises six successive conveyors units. Furthermore, the put position and the get position are provided below two different grid locations, requiring two grid cells for put/get operation.

WO2019141877 discloses a storage system comprising a conveyor system of stacked conveyors configured to convey a storage container from at least one put position to at least one picking and/or supply station. Once the storage container is empty, the empty storage container has to be removed from the conveyor and transferred to a backline conveyor for removal to a remote location where storage containers are returned into the storage system for refilling or other use.

A problem with the prior art conveyor port of FIGS. 4*a* and 4*b* is that the conveyor belt cannot be made longer than approximately three storage containers without compromising the simplistic functionality of the conveyor port. One exemplary problem with the short length of the prior art conveyor port is that a user can get a hand into the put/get position from the access station so that the hand can be damaged by the lifting device. Furthermore, it is not possible to have several layers of conveyors above one another to provide a compact and easy to use picking station suitable for both manual operators and robotic operators.

The aim of the present invention is to alleviate or mitigate at least some of the disadvantages related to the known conveyor systems such as construction complexity, grid utilization and storage container accessibility.

SUMMARY OF THE INVENTION

The present invention is defined by the appended claims and in the following:

In a first aspect, the present invention provides an automated storage and retrieval system comprising a framework structure and a delivery system. The framework structure comprises upright members, horizontal members and a storage volume comprising storage columns and port columns arranged in rows between the upright members and the horizontal members. The framework structure further comprises a rail system arranged across the top of framework structure, the rail system comprising a first set of parallel rails arranged to guide movement of container handling vehicles in a first direction across the top of the frame structure, and a second set of parallel rails arranged perpendicular to the first set of rails to guide movement of the container handling vehicles in a second direction which is perpendicular to the first direction, and access openings to the columns, the container handling vehicles being operable to raise a storage container from the storage columns, and transport the storage container above the storage columns to the port column, and lower the storage container into the port column. The delivery system comprises at least one conveyor system comprising a first conveyor located below the rail system and extending from a first end below the port column to a second end below a second column, the first end arranged to receive the storage container through the port column, the first conveyor comprising a first drive device for moving the storage container on the first conveyor between the first and second ends, and a second conveyor aligned with the first conveyor and arranged as an extension of the first conveyor, the second conveyor having a first end positioned adjacent the first end of the first conveyor and a second end positioned outside an outer periphery of the framework structure, the second conveyor comprising a second drive device for moving the storage container on the second conveyor between its first and seconds ends. The at least one conveyor system is arranged for returning the storage container through the port column by moving the storage container from the second end of the second conveyor to the first end of the first conveyor via the second end of the first conveyor.

In an embodiment of the automated storage and retrieval system, the first drive device may be operated independently of the second drive device.

In an embodiment of the automated storage and retrieval system the second end of the first conveyor may be located below a storage column.

In an embodiment of the automated storage and retrieval system, the second end of the first conveyor may be located below a port column.

In an embodiment of the automated storage and retrieval system, the second end of the second conveyor may be adapted for handling of the storage container by at least one of a robotic operator and a human operator.

In an embodiment of the automated storage and retrieval system, the system may be comprising a set of rails for an auto-pick robot, wherein the second conveyor is passing underneath the set of rails for the auto-pick robot.

In an embodiment of the automated storage and retrieval system, the second conveyor may be comprising weighing devices to weigh the storage containers.

In an embodiment of the automated storage and retrieval system, the weighing devices may be positioned between a support structure of the second conveyor and a mounting surface of the support structure.

In an embodiment of the automated storage and retrieval system, the system may be comprising a plurality of the conveyor systems positioned adjacently one another in vertical direction.

In an embodiment of the automated storage and retrieval system, the system may be comprising a plurality of the conveyor ports positioned adjacent one another in horizontal direction.

In an embodiment of the automated storage and retrieval system, each of the conveyors may be comprising two parallel conveyor-halves, each conveyor half comprising a drive device adapted to move the conveyor half.

In an embodiment of the automated storage and retrieval system, the drive devices may be positioned between the two parallel conveyor-halves.

In an embodiment of the automated storage and retrieval system, each conveyor half may be comprising a plurality of rollers and the drive device comprises at least one belt linking adjacent rollers.

In a second aspect, the present invention provides a method for transporting storage containers in the automated storage and retrieval system of the first aspect of the invention. The method comprises raising, using a first container handling vehicle, a first storage container from a storage column, transporting, using the first container handling vehicle, the first storage container, on the rail system to the port column, lowering, using the first container handling vehicle, the first storage container through the port column onto the first end of the first conveyor and moving, using the first drive device and the second drive devices, the first storage container from the first end of the first conveyor to the second end of the second conveyor. The method further comprises moving, using the first drive device and the second drive devices, the first storage container from the second end of the second conveyor to the first end of the first conveyor via the second end of the first conveyor, and returning the first storage container to the framework structure by lifting, using a second container handling vehicle, the first storage container through the port column.

In an embodiment, the method may further comprise lowering, using the second container handling vehicle, a second storage container through the port column onto the first end of the first conveyor, when the first storage container is on the second end of the first conveyor.

In an embodiment, the method may further comprise leaving the second container handling vehicle in position above the port column after lowering the second storage container onto the first end of the first conveyor.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
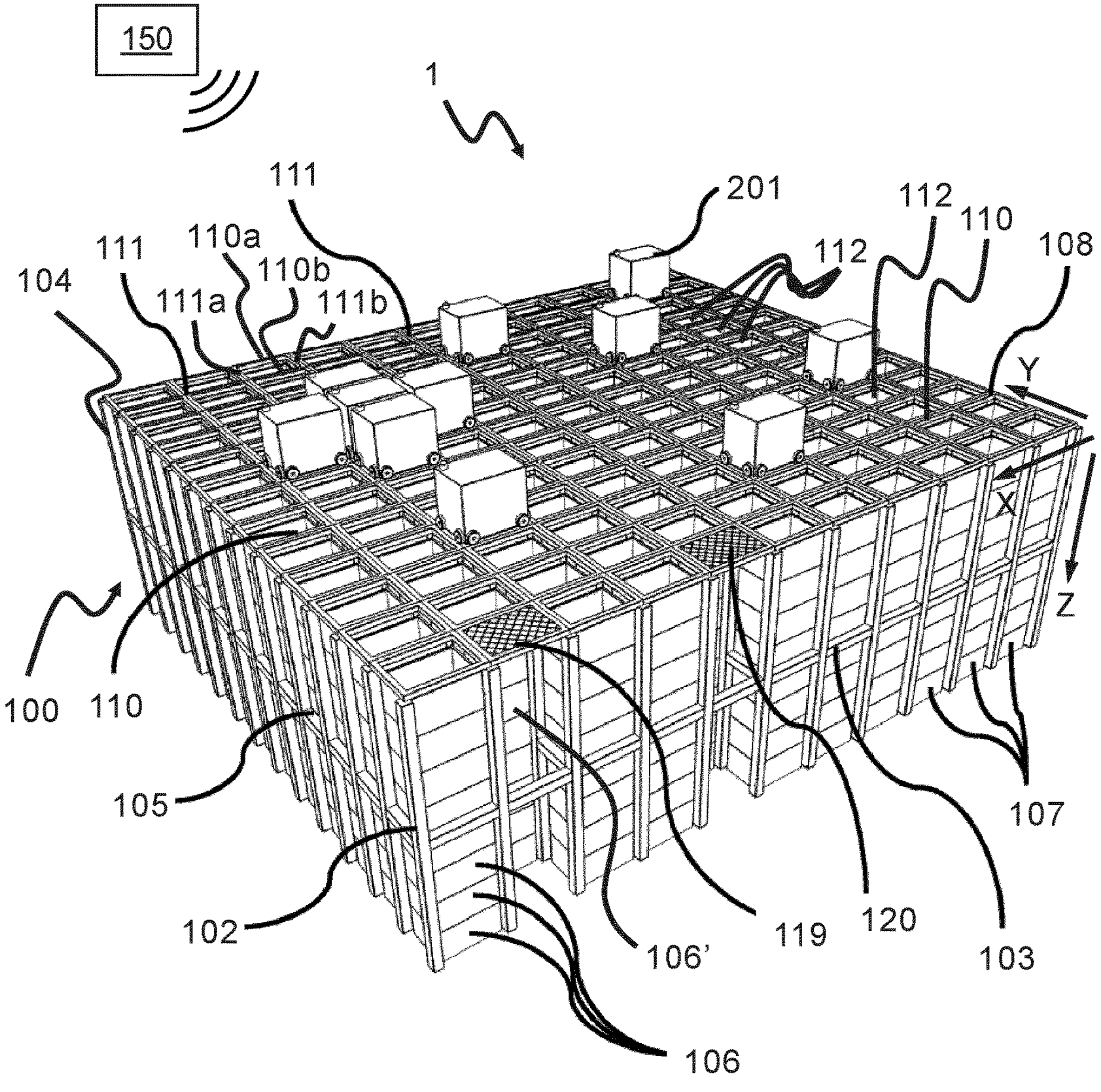
FIG. 1 (Prior Art)
FIG. 1 is a perspective view of a framework structure of a prior art automated storage and retrieval system.

In the following different alternatives will be discussed in more detail with reference to the appended drawings. It should be understood, however, that the drawings are not intended to limit the scope of the invention to the subject matter depicted in the drawings. Furthermore, even if some features are described in relation to the system only, it is apparent that they are valid for the methods as well, and vice versa.

Figure 2:
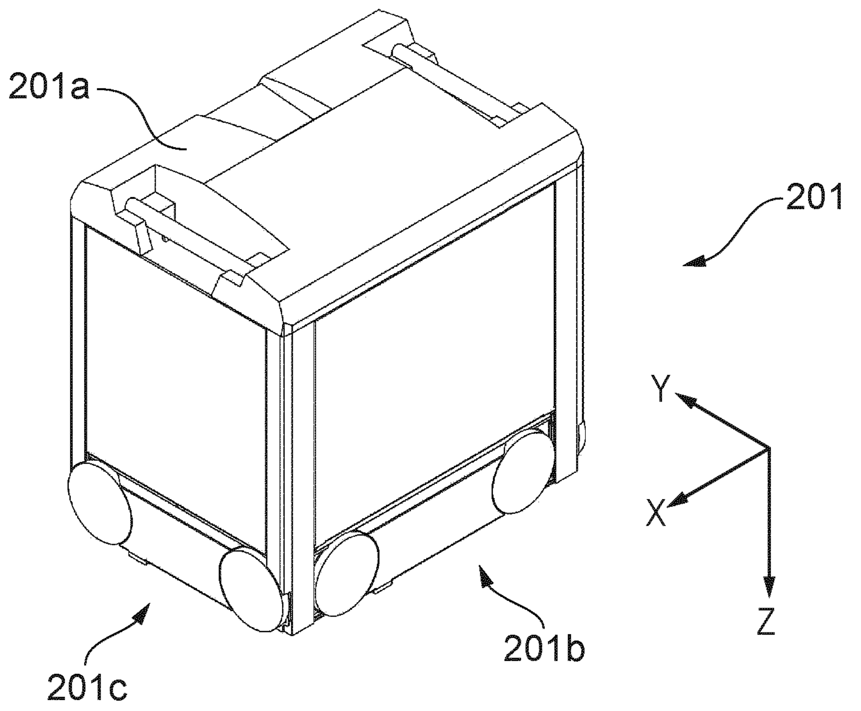
FIG. 2 (Prior Art)
FIG. 2 is a perspective view of a prior art container handling vehicle having a centrally arranged cavity for carrying storage containers therein.
Figure 3:
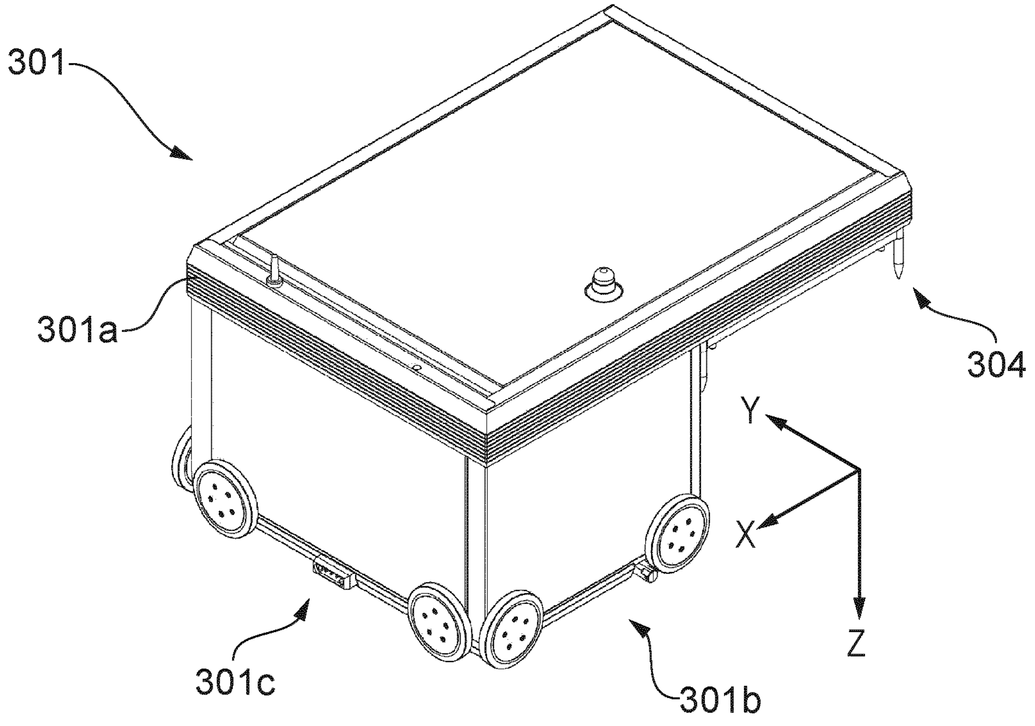
FIG. 3 (Prior Art)
FIG. 3 is a perspective view of a prior art container handling vehicle having a cantilever for carrying storage containers underneath.
Figure 4A:
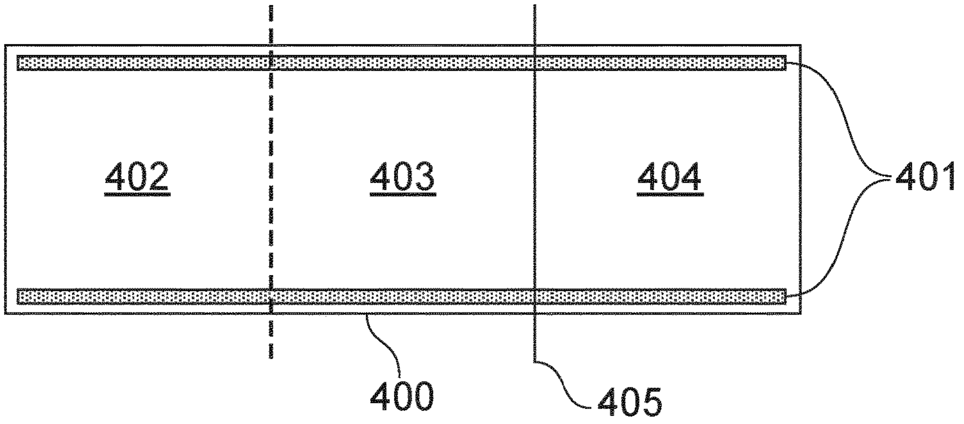
FIG. 4*a* is a schematic top view of a prior art conveyor port.
Figure 4B:
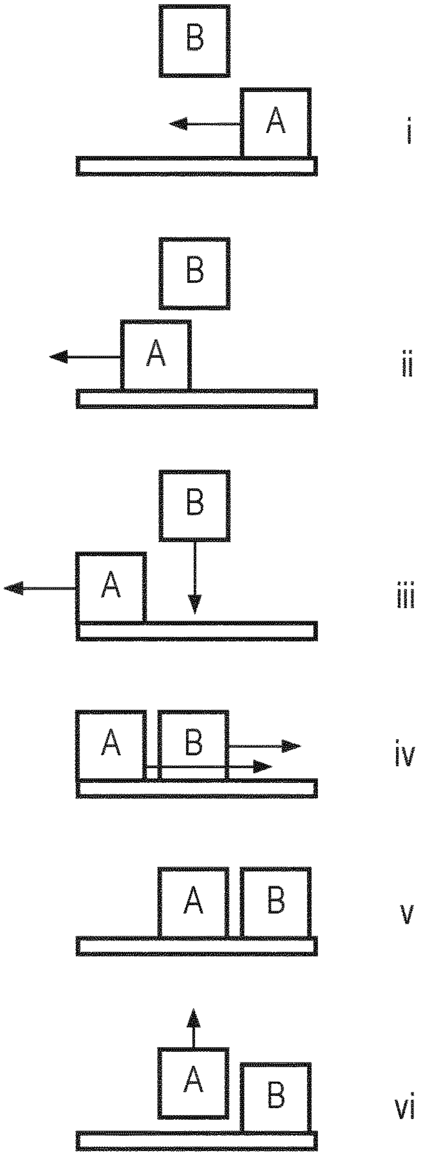
FIG. 4*b* is a schematic illustration of the prior art conveyor port of FIG. 4*a*.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

One embodiment of the automated storage and retrieval system according to the invention will now be discussed in more detail with reference to FIG. 5 and FIG. 6*a*.

Figure 5:
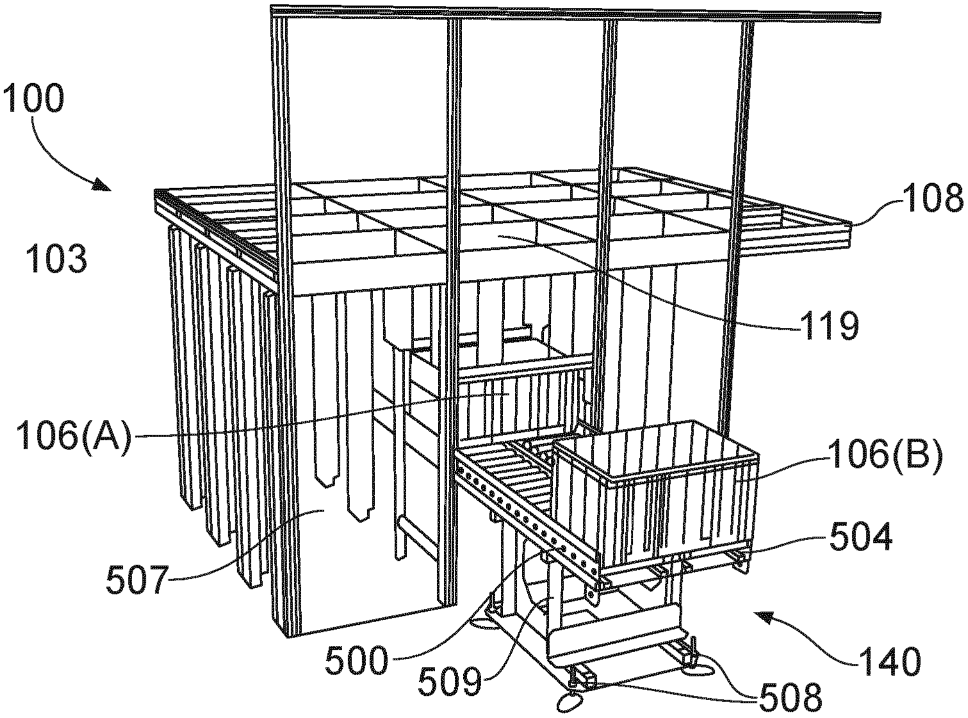
FIG. 5 is a perspective view of an exemplary automated storage and retrieval system according to the present invention.

FIG. 5 is a perspective view of a part of the automated storage and retrieval system 1 comprising a framework structure 100 and a delivery system 140. The delivery system 140 comprises a conveyor system 500, comprising a first conveyor 501 located below the rail system 108 and extending from a first end 503 below the port column 119 to a second end 502 below a second column. The first end 503 is arranged to receive a storage container 106 through the port column 119. The first conveyor 501 comprises a first drive device for moving the storage container 106 on the first conveyor 501 between the first and second ends. The first conveyor 501 has space for at least two storage containers. The delivery system 140 also comprises a second conveyor 505 aligned with the first conveyor 501 and arranged as an extension of the first conveyor 501. The second conveyor 505 has a first end 506 positioned adjacent the first end 503 of the first conveyor 501 and a second end 504 positioned outside an outer periphery 507 of the framework structure. The outer periphery 507 may in one embodiment be provided by a cover 800. The second conveyor 505 comprises a second drive device for moving the storage container on the second conveyor 505 between its first and second ends, 506, 504.

The second end 504 of the second conveyor 505 is located outside the storage grid 104, the outer periphery of the framework structure 100 is illustrated with a solid line 507. The second end 504 may be referred to as an access station, or the handling position of the conveyor port 500. The handling position may be a picking and/or supply station allowing an operator to pick or supply items from/to the storage grid 104. In the illustrated embodiment, the second end 502 of the first conveyor 501 is located below a storage column 105. In an alternative embodiment, the second end 502 of the first conveyor 501 may be located below a port column.

The second conveyor 505 may be provided with weighing devices 508 adapted to weigh the storage bin containers. In the embodiment illustrated in FIG. 5, the weighing devices 508 are positioned between a support structure 509 of the second conveyor 505 and a mounting surface, such as a floor, of the support structure 509. In an alternative embodiment, the weighing devices 508 are positioned between the support structure 509 and the second conveyor 505.

Figure 7:
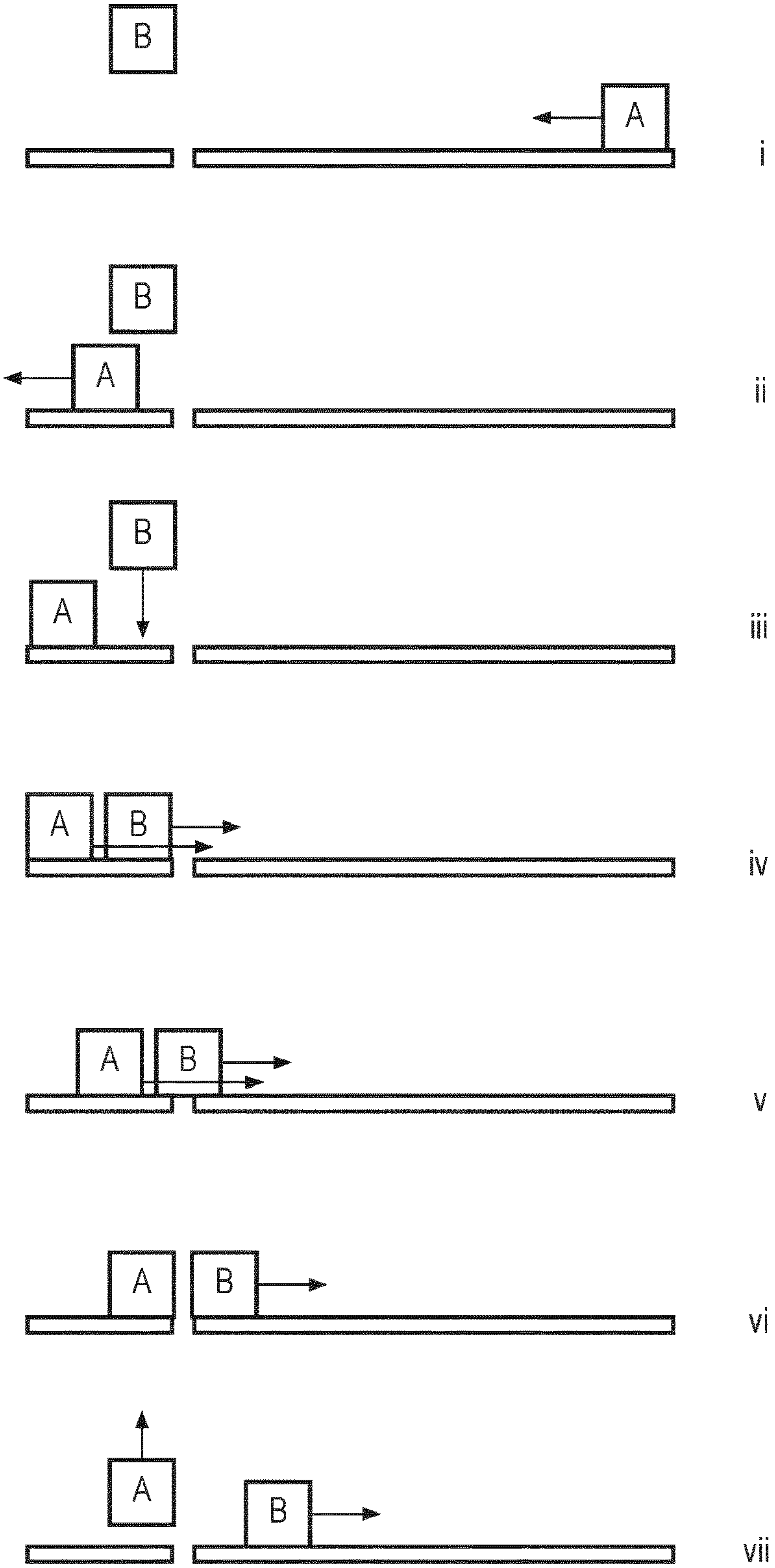
FIG. 7 is a schematic illustration of an an exemplary automated storage and retrieval system according to the present invention.

FIG. 7 schematically illustrates the functionality of the conveyor port 500. i-ii) Once a storage container A has been presented to an operator at the handling position 504, the second drive device of the second conveyor 505 moves the storage container A from the handling position 504 to the first end 506, then to the first end 503 of the first conveyor 501, that, using the first drive device of the first conveyor 501, moves the storage container to the second end 502 of the first conveyor 501. The second end 502 of the first conveyor is also referred to as the wait position 502. While the storage container A was presented to the operator, another storage container B was lowered through the port column 119 to a position above the first end 503 of the first conveyor 501. The first end 503 of the first end of the first conveyor is also referred to as the get/put position 503. Storage container B may be held in position by the lifting device of a container handling vehicle 201, 301. iii) While the storage container A is in the wait position 502, the storage container B is lowered and released on the first conveyor 501 in the get/put position 503, e.g. by the lifting device of the container handling vehicle. iv-v) Once the storage container B has been released on the first conveyor 501, the first conveyor 501 moves both the storage container A and the storage container B simultaneously, such that storage container A is moved to the get/put position 503, and storage container B is moved onto the first end 506 of the second conveyor 505. The first conveyor 501 stops moving when storage container A is in the get/put position 503. vi) The second conveyor 505, moving independently of the first conveyor 501, continues to move the storage container B towards the handling position 504. vii) While the storage container B moves towards the handling position 504, or is in the handling position 504, storage container A is lifted through the port column 119, e.g. by the lifting device of the container handling vehicle, for storage in a storage column 105.

In this way, the at least one conveyor system 500 is arranged for returning the storage container 106 through the port column 119 by moving the storage container 106 from the second end 504 of the second conveyor 505 to the first end 503 of the first conveyor 501 via the second end 502 of the first conveyor 501.

Once storage container A has been removed from the port column 119, another storage container may be lowered through the port column 119 to the position above the get/put position 503. For a quick removal of a storage container from the conveyor belt 501, the lifting device of the handling vehicle may be kept in a ready position immediately above the get/put position 503 after releasing the storage container on the conveyor belt 501.

The first drive device may be operated independently of the second drive device, and vice versa. The use of two independently operable conveyors 501, 505 instead of the single belt conveyor 401, allows for making a longer conveyor than possible for the conveyor port 400 while maintaining the same functionality.

Figure 8:
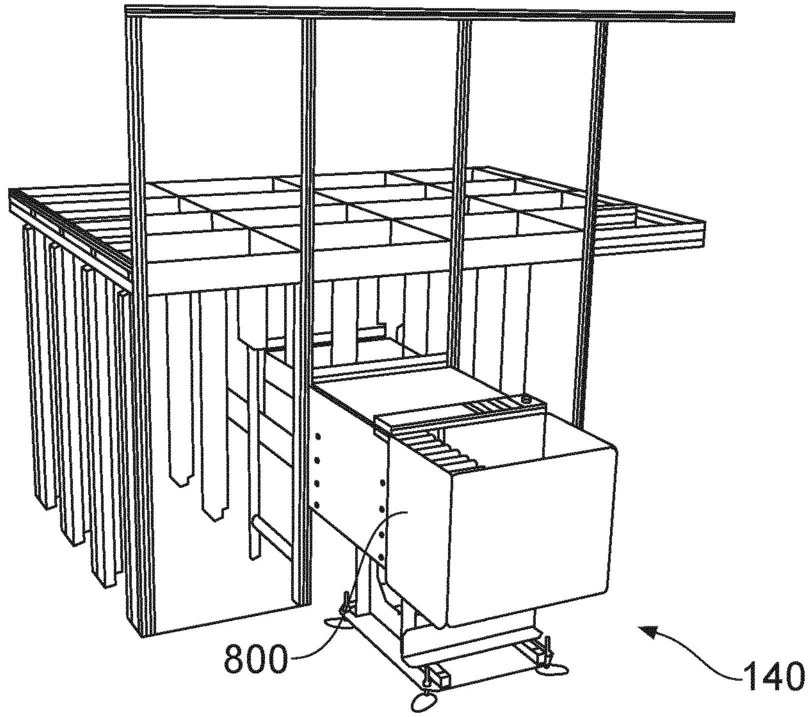
FIG. 8 is a perspective view of an exemplary automated storage and retrieval system according to the present invention.

In one exemplary embodiment, the second conveyor 505 is made sufficiently long to avoid an operator reaching the get/put position 503 where the container handling vehicles operates, thus making the operation of a manual access station safer. One such embodiment is illustrated in FIG. 8, where a cover 800 is positioned between the outer periphery 507 of the framework structure 100 and the handling position 504.

The present invention is not limited by the length of the second conveyor 505. As such, the first conveyor 501, and hence the get/put position 503 and the corresponding port column 119 is not required to be positioned close to the periphery of the framework structure 100. The port column 119 may be put anywhere inside the framework structure 100.

The framework structure 100 may be provided with a plurality of delivery system 140. In one exemplary embodiment, a second delivery system may be positioned below the second port column 120.

Figure 6A:
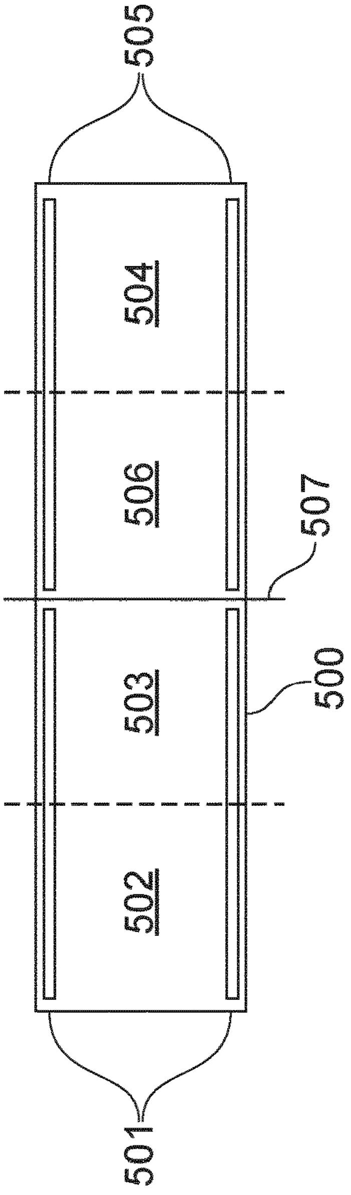
FIGS. 6*a*-6*b* is a schematic top view of exemplary conveyor systems according to the present invention.
Figure 6B:
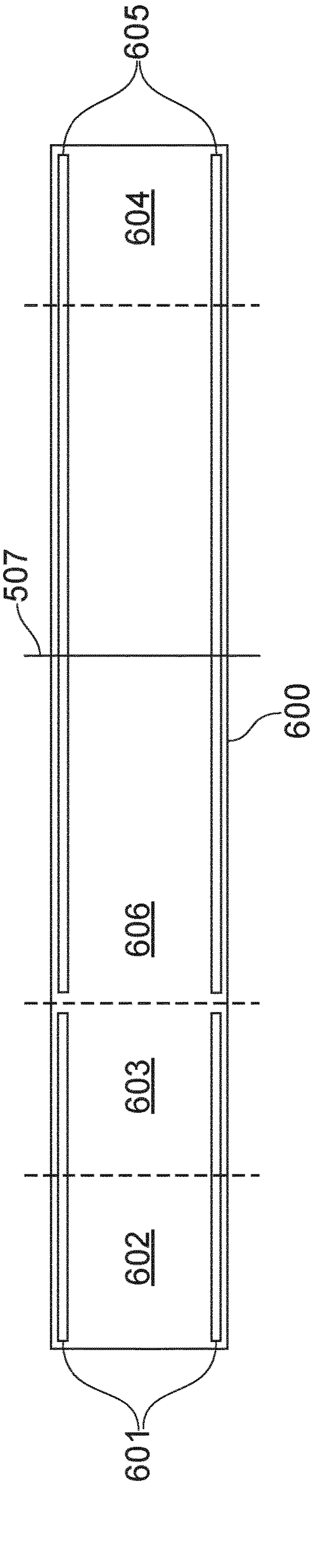

In one exemplary embodiment, as illustrated in FIGS. 6*a*, 6*b*, FIG. 9 and FIG. 10, the delivery system 140 further comprises a plurality of conveyor systems 500, 600 positioned adjacent one another in a vertical direction. A second conveyor system 600 is positioned below the first conveyor system 500. The second conveyor system 600 is longer than the first conveyor system 500 and extends further into rail system 108 as well as further out of the framework structure 100. FIGS. 6*a* and 6*b* illustrates the alignment of the first 500 and second 600 conveyor system. The outer periphery of the framework structure 100 is illustrated by the solid line 507 for both systems.

Figure 9:
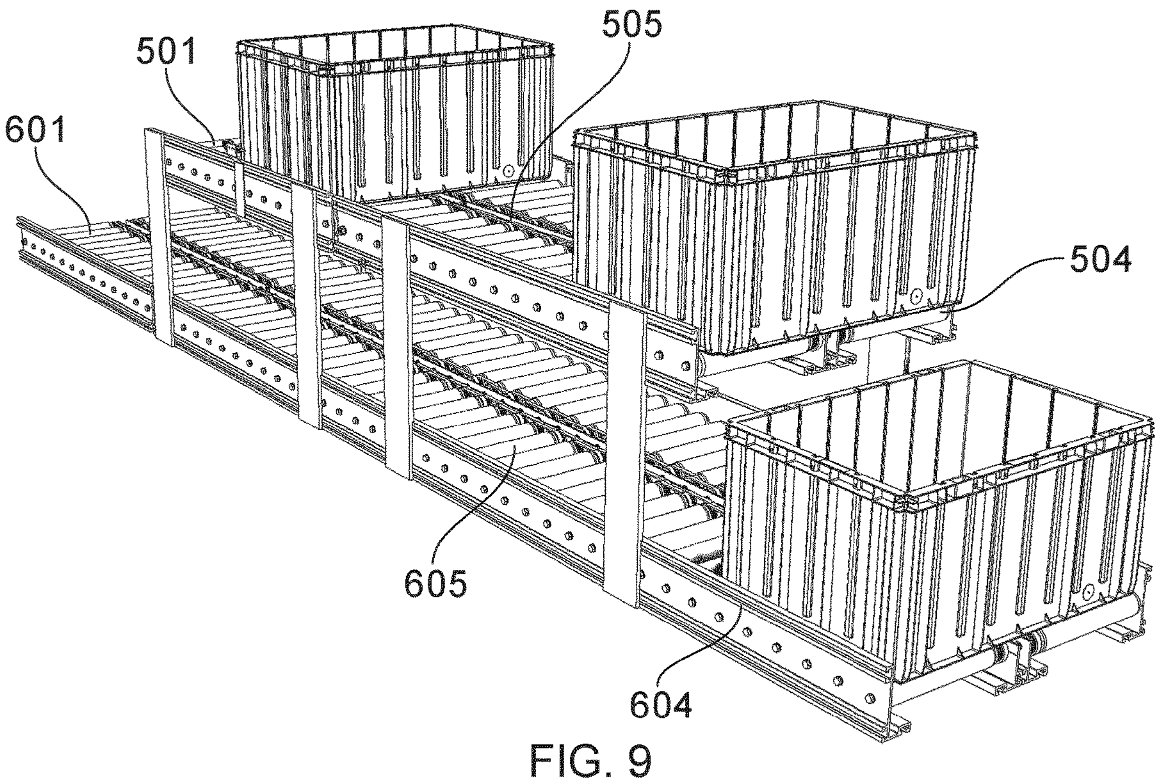
FIG. 9 is a perspective view of an exemplary automated storage and retrieval system according to the present invention.

The second conveyor system 600 comprises a third conveyor 601 located below the rail system 108 and extending from a first end 603 to a second end 602 at a second location. The first end 603 of the third conveyor 601 is positioned below a third port column 121 further into the container rail system 108 than the first port column 119. The third port column 121 is typically positioned adjacent the second end 502 of the first conveyor 501. The third conveyor 601 comprises a third drive device for moving a storage container on the third conveyor 601 between the first and second ends. The third conveyor 601 has space for at least two storage containers. The second conveyor system 600 also comprises a fourth conveyor 605 aligned with the third conveyor 601 and arranged as an extension of the third conveyor 601. The fourth conveyor 605 has a first end 606 positioned adjacent the first end 603 of the third conveyor 601 and a second end 604 positioned outside the outer periphery 507 of the framework structure 100. The second end 604 is typically positioned adjacent the second end 504 of the second conveyor 505. This configuration, as illustrated in FIG. 9 allows for easy access to two storage bins at the same time. The fourth conveyor 605 comprises a fourth drive device for moving the storage container on the fourth conveyor 605 between its first 606 and second 604 end. The exemplary fourth conveyor 605 has a size corresponding to approximately five storage containers.

Figure 10:
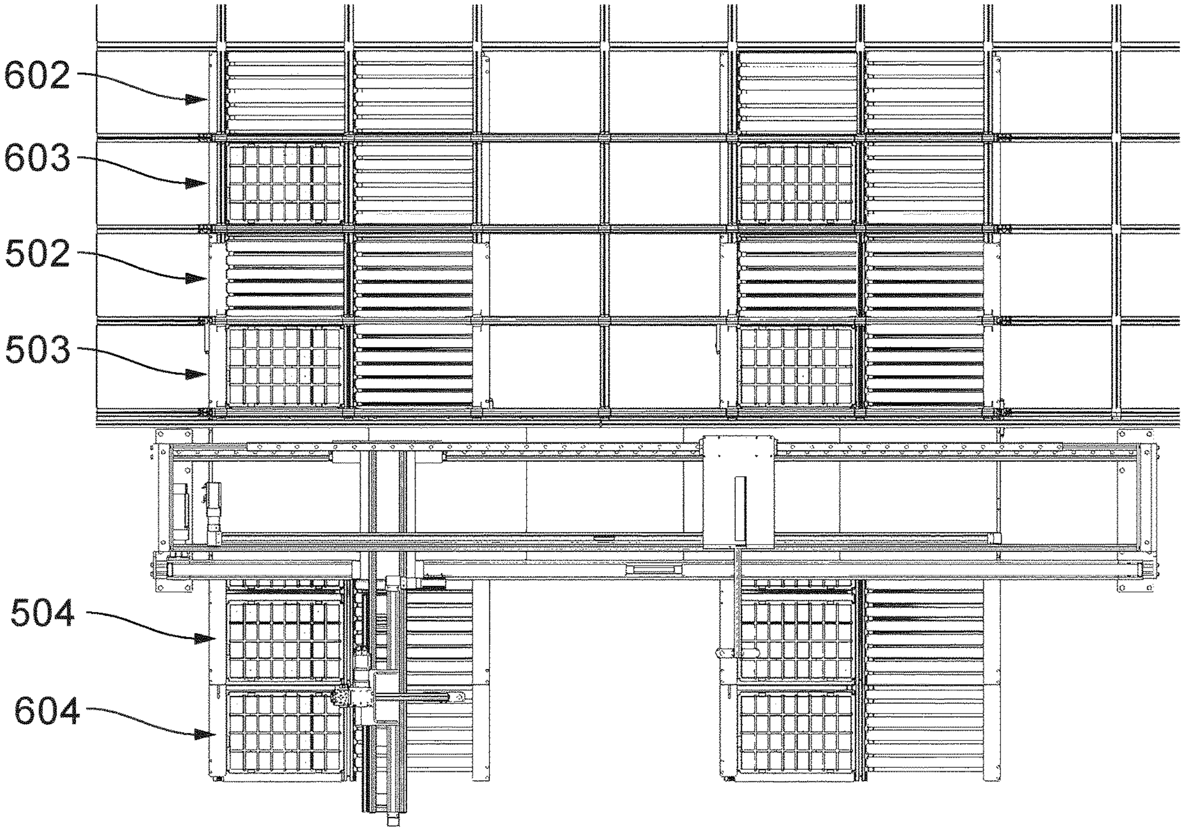
FIG. 10 is a top view of an exemplary automated storage and retrieval system according to the present invention.

With reference to FIG. 10, in an exemplary embodiment of the present invention, the automated storage and retrieval system may further comprise a plurality of the conveyor ports positioned adjacent one another in a horizontal direction. The illustrated automated storage and retrieval system 1 has four conveyor systems 140, each comprising two conveyor systems 500, 600. In the illustrated embodiment, the first end 503 of the first conveyor 501 is located below port column 119, and the first end 603 of the first conveyor 601 is located below port column 121.

Also illustrated in FIG. 10, the automated storage and retrieval system may further comprise a set of rails for an auto-pick robot, where the second conveyor 505, 605 passes underneath the set of rails for the auto-pick robot. This configuration may use auto-pick robots having a smaller range of movement than on grid auto-pick robots, thus operational speed may be increased. Furthermore, that the auto-pick robots are positioned outside a periphery of the of the framework structure 100 allows for manual pick by an operator if the auto-pick robot is out of service.

In one exemplary embodiment, the conveyor systems 140 are positioned adjacent an external conveyor system. The auto-pick robot may then pick from the storage containers and deliver to containers on an external conveyor system. The containers on the external conveyor may be cardboard boxes or other bags or boxes made for shipment directly to consumers.

In the illustrated exemplary embodiments, the first conveyor 501 and the second conveyor 505 are arranged horizontally, however, in one alternative embodiment the second conveyor 505 is arranged in a declining or inclining angle relative to the first conveyor 501, such that the storage container may be moved to a picking station at a different vertical level.

Each conveyor 501, 505, 601, 605 may be of any suitable conveyor technology, such as one or more belts, or a plurality of rollers.

Conventional roller conveyors are problematic when the storage containers 106 do not have a flat bottom surface, which is the case for most stackable storage containers, thus when the conveyor is a roller conveyor a storage container on the conveyor will only be in contact with the outer portions of the rolls. The small amount of contact between the rolls and the storage container may lead to slippage of the storage container on the rollers. The drive belt for the rolls is located on the outer end of the rolls where the storage container is in contact with the rolls. When the width of the conveyor is approximately the same width as the storage container, the storage container will also contact the drive belt. As the diameter is smaller where the drive belt is positioned the storage bin will twist and may get stuck on the conveyor. When the roller is wider, such that the drive belt is outside where the storage container is in contact with the rolls, the twisting would not occur, however, the conveyor would then be too wide to put the conveyor ports side-by-side.

Figure 11:
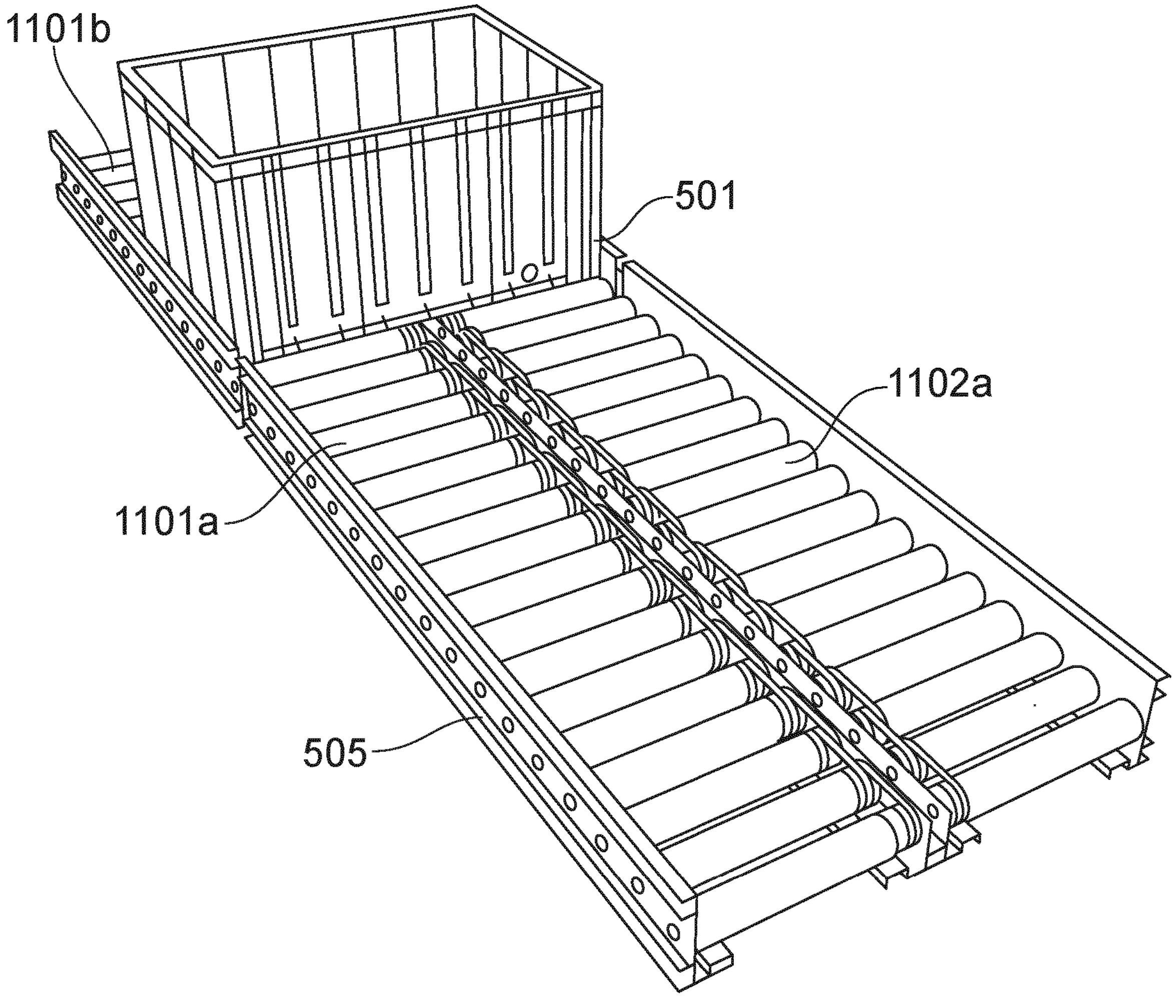
FIG. 11 is a perspective view of an exemplary roller conveyor according to the present invention.
Figure 12:
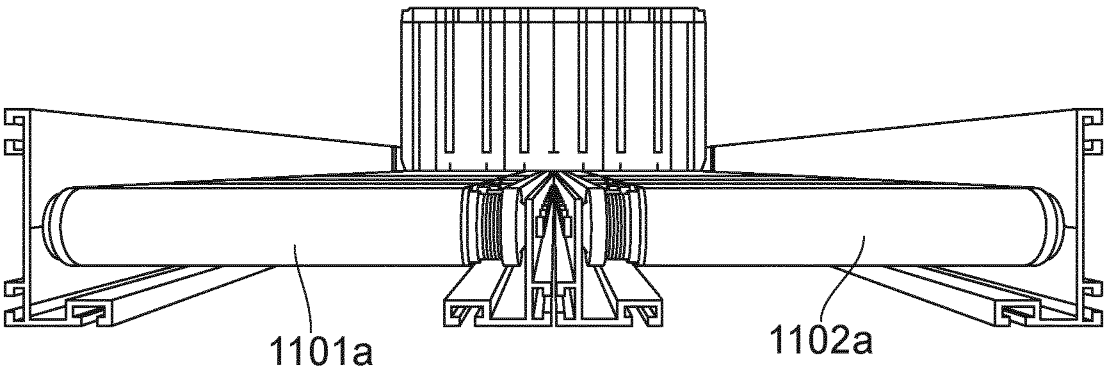
FIG. 12 is a side view of the exemplary roller conveyor of FIG. 11.

In one exemplary embodiment that may be combined with any of the embodiments disclosed above, with reference to FIGS. 11 and 12, each of the conveyors 501, 505 may comprise pairs of conveyors side by side, or parallel conveyor halves 1101*a*, 1101*b*, 1102*a*, 1102*b* (not shown). Each of the conveyor halves further comprising a drive device (not shown) adapted to move the conveyor half. In the illustrated exemplary embodiment, the drive devices are positioned between the two parallel conveyor-halves 1101*a*, 1101*b*, 1102*a*, 1102*b*. In the illustrated exemplary embodiment each conveyor-half 1101*a*, 1101*b*, 1102*a*, 1102*b* comprises a plurality of rollers, and the drive devices comprise at least one belt linking adjacent rollers.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Prior art automated storage and retrieval system
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)

110*a* First rail in first direction (X)
110*b* Second rail in first direction (X)
111 Parallel rail in second direction (Y)
111*a* First rail of second direction (Y)
111*b* Second rail of second direction (Y)
112 Access opening
119 First port column
120 Second port column
121 Third port column
140 Delivery system
150 Control system
201*a* Vehicle body of the storage container vehicle 201
201*b* Drive means/wheel arrangement, first direction (X)
201*c* Drive means/wheel arrangement, second direction (Y)
301 Prior art cantilever storage container vehicle
301*a* Vehicle body of the storage container vehicle 301
301*b* Drive means in first direction (X)
301*c* Drive means in second direction (Y)
304 Gripping device
X First direction
Y Second direction
Z Third direction
500 First conveyor system
501 First conveyor
502 Second end of first conveyor (501)/Wait position
503 First end of first conveyor (501)/Get/put position
504 Second end of second conveyor (505)/Handling position
505 Second conveyor
506 First end of second conveyor (505)
507 Outer periphery of framework structure (100)
508 Weighing device
509 Support structure
600 Second conveyor system
601 Third conveyor
602 Second end of third conveyor (601)/Wait position
603 First end of third conveyor (601)/Get/put position
604 Second end of fourth conveyor (605)/Handling position
605 Fourth conveyor
606 First end of fourth conveyor (605)
800 Cover
1101*a*, 1102*a* Parallel conveyor halves of first conveyor (501)
1101*b*, 1102*b* Parallel conveyor halves of second conveyor (505)

The invention claimed is:

1. An automated storage and retrieval system comprising a framework structure and a delivery system, wherein the framework structure comprises:

upright members, horizontal members and a storage volume comprising storage columns and port columns arranged in rows between the upright members and the horizontal members;

a rail system arranged across the top of the framework structure, the rail system comprising a first set of parallel rails arranged to guide movement of container handling vehicles in a first direction across the top of the framework structure, and a second set of parallel rails arranged perpendicular to the first set of rails to guide movement of the container handling vehicles in a second direction which is perpendicular to the first direction, and access openings to the columns, the container handling vehicles being operable to raise a storage container from the storage columns, and transport the storage container above the storage columns to the port column, and lower the storage container into the port column;

the delivery system comprises at least one conveyor system comprising:

a first conveyor located below the rail system and extending from a first end below the port column to a second end below a second column, the first end arranged to receive the storage container through the port column, the first conveyor comprising a first drive device for moving the storage container on the first conveyor between the first and second ends;

a second conveyor aligned with the first conveyor and arranged as an extension of the first conveyor, the second conveyor having a first end positioned adjacent the first end of the first conveyor and a second end positioned outside an outer periphery of the framework structure, the second conveyor comprising a second drive device for moving the storage container on the second conveyor between first and seconds ends of the second conveyor; and wherein the at least one conveyor system is arranged for returning the storage container through the port column by moving the storage container from the second end of the second conveyor to the first end of the first conveyor via the second end of the first conveyor;

wherein the automated storage and retrieval system further comprises a plurality of the conveyor systems positioned adjacent one another in a vertical direction or in a horizontal direction.

2. The automated storage and retrieval system according to claim 1, wherein the first drive device is operated independently of the second drive device.

3. The automated storage and retrieval system according to claim 1, wherein the second end of the first conveyor is located below a storage column.

4. The automated storage and retrieval system according to claim 1, wherein the second end of the first conveyor is located below a port column.

5. The automated storage and retrieval system according to claim 1, wherein the second end of the second conveyor is adapted for handling of the storage container by at least one of a robotic operator and a human operator.

6. The automated storage and retrieval system according to claim 1, wherein the second conveyor further comprising weighing devices to weigh the storage containers.

7. The automated storage and retrieval system according to claim 6, wherein the weighing devices are positioned between a support structure of the second conveyor and a mounting surface of the support structure.

8. The automated storage and retrieval system according to claim 1, wherein each of the first conveyor and the second conveyor comprises two parallel conveyor-halves, each conveyor half comprising a drive device adapted to move the conveyor half.

9. The automated storage and retrieval system according to claim 8, wherein the drive device is positioned between the two parallel conveyor-halves.

10. The automated storage and retrieval system according to claim 8, wherein each conveyor half comprises a plurality of rollers and the drive device comprises at least one belt linking adjacent rollers.

11. A method for transporting storage containers in an automated storage and retrieval system comprising a framework structure and a delivery system, wherein the framework structure comprises:

upright members, horizontal members, and a storage volume comprising storage columns and port columns arranged in rows between the upright members and the horizontal members;

a rail system arranged across the top of the framework structure, the rail system comprising a first set of parallel rails arranged to guide movement of container handling vehicles in a first direction across the top of the framework structure, and a second set of parallel rails arranged perpendicular to the first set of rails to guide movement of the container handling vehicles in a second direction which is perpendicular to the first direction, and access openings to the columns, the container handling vehicles being operable to raise a storage container from the storage columns, and transport the storage container above the storage columns to the port column, and lower the storage container into the port column;

the delivery system comprises at least one conveyor system comprising:

a first conveyor located below the rail system and extending from a first end below the port column to a second end below a second column, the first end arranged to receive the storage container through the port column, the first conveyor comprising a first drive device for moving the storage container on the first conveyor between the first and second ends;

a second conveyor aligned with the first conveyor and arranged as an extension of the first conveyor, the second conveyor having a first end positioned adjacent the first end of the first conveyor and a second end positioned outside an outer periphery of the framework structure, the second conveyor comprising a second drive device for moving the storage container on the second conveyor between first and seconds ends of the second conveyor;

wherein the at least one conveyor system is arranged for returning the storage container through the port column by moving the storage container from the second end of the second conveyor to the first end of the first conveyor via the second end of the first conveyor;

wherein the automated storage and retrieval system further comprises a plurality of the conveyor systems positioned adjacent one another in a vertical direction or in a horizontal direction, wherein the method comprises:

raising, using a first container handling vehicle, a first storage container from a storage column;

transporting, using the first container handling vehicle, the first storage container, on the rail system to the port column;

lowering, using the first container handling vehicle, the first storage container through the port column onto the first end of the first conveyor;

moving, using the first drive device and the second drive device, the first storage container from the first end of the first conveyor to the second end of the second conveyor;

moving, using the first drive device and the second drive device, the first storage container from the second end of the second conveyor to the first end of the first conveyor via the second end of the first conveyor; and returning the first storage container to the framework structure by lifting, using a second container handling vehicle, the first storage container through the port column.

12. The method according to claim 11, wherein the method further comprises lowering, using the second container handling vehicle, a second storage container through the port column onto the first end of the first conveyor, when the first storage container is on the second end of the first conveyor.

13. The method according to claim 12, wherein the method further comprises leaving the second container handling vehicle in position above the port column after lowering the second storage container onto the first end of the first conveyor.

* * * * *